United States Patent
Kundu et al.

(10) Patent No.: US 9,870,162 B2
(45) Date of Patent: Jan. 16, 2018

(54) METHOD TO VIRTUALIZE PCIE CONTROLLERS TO SUPPORT BOOT/HIBERNATION/CRASH-DUMP FROM A SPANNED VIRTUAL DISK

(71) Applicant: Dell Products L.P., Round Rock, TX (US)

(72) Inventors: Anirban Kundu, Bangalore (IN); Abhijit Rajkumar Khande, Bangalore (IN); Krishna Kumar P.K., Bangalore (IN)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 15/074,452

(22) Filed: Mar. 18, 2016

(65) Prior Publication Data

US 2017/0269857 A1 Sep. 21, 2017

(51) Int. Cl.
| | |
|---|---|
| G06F 13/20 | (2006.01) |
| G06F 3/06 | (2006.01) |
| G06F 13/24 | (2006.01) |
| G06F 13/42 | (2006.01) |
| G06F 9/44 | (2006.01) |

(52) U.S. Cl.
CPC .......... *G06F 3/0619* (2013.01); *G06F 3/0665* (2013.01); *G06F 3/0688* (2013.01); *G06F 3/0689* (2013.01); *G06F 9/4401* (2013.01); *G06F 13/24* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 5,671,439 A | 9/1997 | Klein et al. | |
| 6,260,109 B1 | 7/2001 | Ofer et al. | |
| 2004/0024962 A1* | 2/2004 | Chatterjee | G06F 3/0613 |
| | | | 711/114 |
| 2004/0243386 A1 | 12/2004 | Stolowitz et al. | |
| 2005/0060611 A1 | 3/2005 | Benhase et al. | |
| 2006/0106982 A1 | 5/2006 | Ashmore et al. | |
| 2006/0161707 A1 | 7/2006 | Davies et al. | |
| 2006/0161709 A1 | 7/2006 | Davies | |
| 2006/0277347 A1 | 12/2006 | Ashmore et al. | |
| 2008/0222661 A1* | 9/2008 | Belyakov | H04L 67/1097 |
| | | | 719/321 |
| 2011/0258365 A1 | 10/2011 | Cho | |

(Continued)

*Primary Examiner* — Michael Sun
(74) *Attorney, Agent, or Firm* — Jackson Walker L.L.P.

(57) ABSTRACT

An information handling system recognizes PCIe-based RAID volumes, including RAID virtual disks spanning two or more NVMe storage drives, while performing boot, hibernation, and crash-dump functions, rather than treating each storage device and its corresponding storage controller separately. The information handling system may perform a two-tiered discovery/initialization process during which a storage protocol function driver detects and initializes physical storage controllers, a storage controller bus driver virtualizes all physical storage controllers of a particular storage protocol and exposes a single virtualized storage controller for the protocol. A virtual miniport driver may then detect RAID volumes associated with the virtual storage controller and initialize the detected RAID stack(s).

20 Claims, 15 Drawing Sheets

(56) References Cited

U.S. PATENT DOCUMENTS

| | | |
|---|---|---|
| 2011/0258382 A1 | 10/2011 | Cho |
| 2011/0271143 A1 | 11/2011 | Cho |
| 2012/0030410 A1 | 2/2012 | Cho |
| 2012/0030417 A1 | 2/2012 | Cho |
| 2012/0072661 A1 | 3/2012 | Cho |
| 2012/0110231 A1 | 5/2012 | Cho |
| 2012/0198115 A1 | 8/2012 | Cho |
| 2012/0198116 A1 | 8/2012 | Cho |
| 2012/0239849 A1 | 9/2012 | Brahmaroutu et al. |
| 2012/0317335 A1 | 12/2012 | Cho |
| 2012/0317336 A1 | 12/2012 | Cho |
| 2012/0331338 A1 | 12/2012 | Cho |
| 2013/0054870 A1 | 2/2013 | Cho |
| 2013/0117767 A1* | 5/2013 | Myrah ................. G06F 13/102 719/326 |
| 2013/0159637 A1* | 6/2013 | Forgette ................ G06F 3/0605 711/154 |
| 2014/0082245 A1 | 3/2014 | Wu |
| 2014/0359263 A1 | 12/2014 | Belusar et al. |
| 2015/0331765 A1 | 11/2015 | Madhusudana et al. |
| 2016/0210057 A1* | 7/2016 | Khande ................ G06F 3/0689 |

* cited by examiner

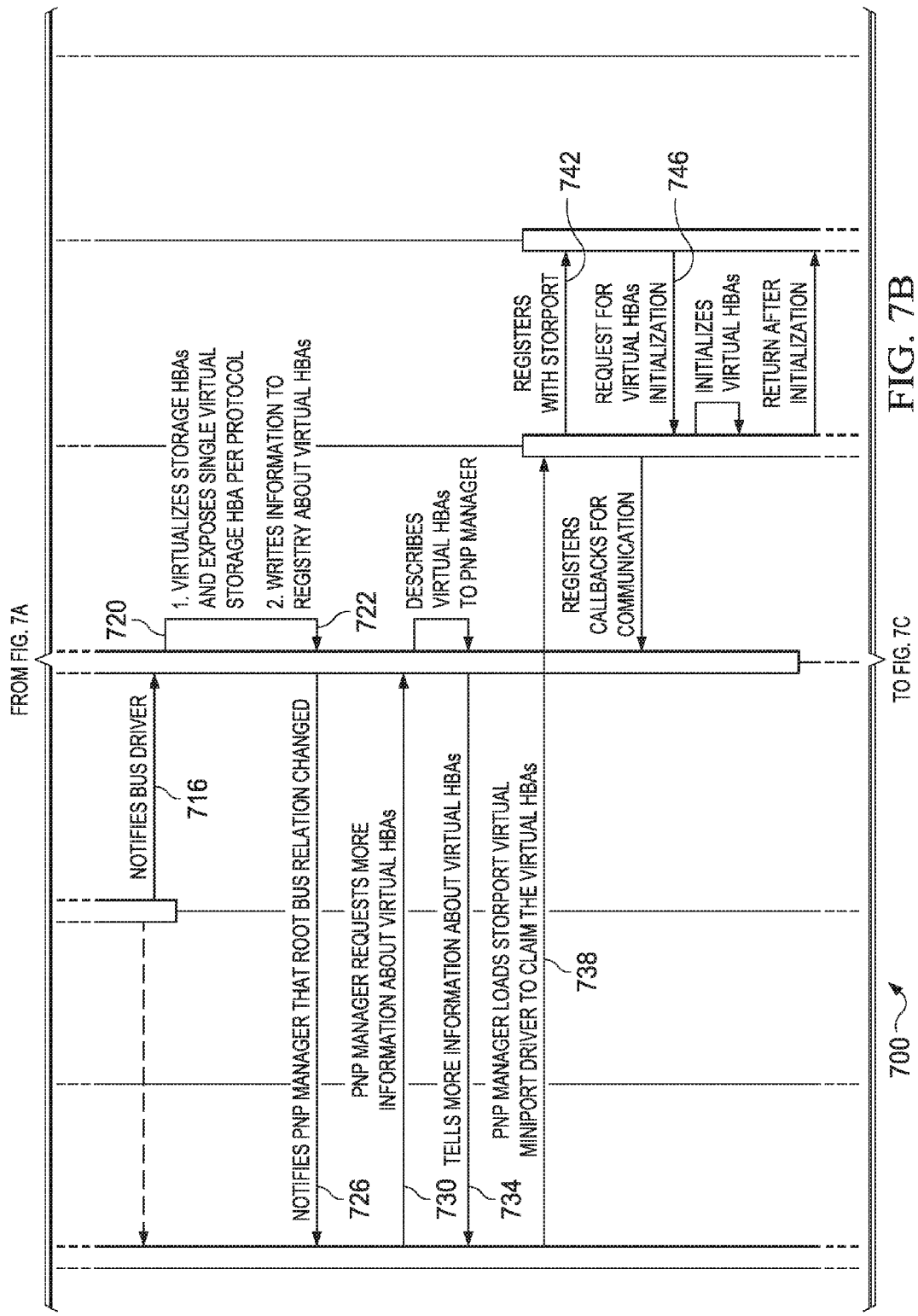

METHOD TO VIRTUALIZE PCIE CONTROLLERS TO SUPPORT BOOT/HIBERNATION/CRASH-DUMP FROM A SPANNED VIRTUAL DISK

TECHNICAL FIELD

The present disclosure generally relates to data storage systems and in particular to storage systems employing at least one redundant array of independent disks (RAID) volume.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with remote or cloud storage systems. Both local computer storage systems and remote or cloud storage systems can support RAID configurations that use hard disk drives or solid state storage drives. Various "levels" of RAID configurations are well known to those in the field of data storage systems.

Historically, RAID driver development and support has been concentrated on traditional mass storage protocols, including SATA, SCSI, SAS, FC, ATA, and IDE. More recently, PCIe-based storage drives, including NVMe drives, have raised the prospect of RAID volumes spanning multiple PCI/PCIe devices, including systems that employ PCI/PCIe based RAID volumes as a boot disk. Whereas traditional mass storage bus protocols recognize the concept of a storage controller associated with two or more physical drives, PCIe treats each connected device as an individual controller. This distinction must be addressed to accommodate PCI/PCIe-based RAID volumes.

SUMMARY

A system that employs a RAID virtual disk spanning multiple PCI/PCIe storage drives as a boot drive must address a number of issues with respect to boot, hibernation, and crash dump.

Existing RAID driver models, including, as at least one example, Windows™™, may use a top-down approach for discovery/initialization. In Windows™™, the inbox Storport driver controls the initialization of controllers separately, leaving no room for RAID drivers to get their RAID Core ready. Thus, to support boot of RAID volumes spanned across multiple storage controllers, the driver must hold back responding to an "INQUIRY" command for the Boot LUN and issuing a "SCSI Reset" to force the operating system (OS) to initiate SCSI discovery again. However if not done at the right time, the OS gives up and OS boot fails.

Existing RAID drivers do not have control over PNP/Power requests sent to storage controllers. When a PNP/Power request is received by a RAID driver, it needs to reinitialize the RAID Core to reflect the new state of virtual disks, physical disks, and controllers.

In at least one embodiment, disclosed subject matter enables an information handling system to recognize PCIe-based RAID volumes while performing boot, hibernation, or crash-dump functions, rather than treating each storage device and its corresponding storage controller/host bus adapter (HBA), separately. A Plug and Play (PNP)/Power command, as an example, is typically executed for each PCI-connected device through an appropriate PCI bus driver. When, however, a group of two more PCIe storage devices are intended to function as a RAID virtual disk or, more simply, a RAID volume, the system's driver stack recognizes the RAID volume and treats it as a single PCI-connected device with respect to at least some commands, functions, and configuration settings.

Enabling crash-dump/hibernation from a spanned RAID virtual disk raises challenges. For example, the OS-supplied storport driver may not send the RAID driver initialization requests for all storage controllers associated with a RAID boot volume. In such cases, the RAID driver may be unable to initialize all PCI/PCIe storage controllers and may therefore be unable to access boot volume disks on any un-initialized controllers.

In addition, the crash-dump/hibernation path is different from the normal input/output (I/O) path. Hibernation/crash-dump occurs in a restricted environment with limited memory and in which the I/O Manager and PNP Manager are non-functional. Each RAID virtual disk must be associated with a storage controller/HBA through which it gets exposed.

Disclosed embodiments support boot/hibernation/crash-dump for RAID volumes spanning multiple PCI/PCIe controllers with features not tied to any particular vendor and without requiring additional hardware. Disclosed embodiments may also be extended to domains other than storage. Disclosed subject matter supports Boot-Hibernation-Crash-Dump from a RAID volume that spans multiple PCI/PCIe storage controllers/HBAs.

For each storage protocol applicable to a particular system, including, as non-limiting examples, SATA, SAS, NVMe, FC, etc., disclosed embodiments may virtualize all storage controllers/HBAs of a particular protocol into a single, protocol-specific virtual storage controller/HBA. To illustrate using an example system with two SATA controllers, three SAS controllers, and four NVMe devices, a disclosed driver stack may virtualize these nine individual controllers into three virtual controllers including a virtual SATA controller corresponding to the two SATA controllers, a virtual SAS controller corresponding to the three SAS controllers, and a virtual NVMe controller corresponding to the four NVMe devices.

In at least one embodiment, RAID volumes created from physical disks associated with controllers/HBAs of a particular protocol are associated with the applicable protocol-specific virtual controller/HBA. For example, a system may have two SATA controllers and five NVMe devices, with four physical disks behind the two SATA controllers. If a user creates one RAID10 volume using the four physical disks behind the two SATA controllers, then the RAID10 volume will be associated with one virtual SATA controller, which will expose the virtual SATA controller when the OS sends a REPORT_LUN command. In addition, if the user creates one RAID1 volume from two of the five NVMe devices and one RAID5 volume from three of the five NVMe devices, then the RAID1 volume and the RAID5 volume will both be associated with the NVMe-specific virtual controller, which will expose both of the NVMe-RAID volumes when the OS sends a REPORT_LUN command.

Virtualizing all NVMe storage controllers/HBAs into a single, NVMe-specific virtual storage controller/HBA will cause the OS to see the virtualized storage controller/HBA as a single PCI/PCIe endpoint. As a result, the OS will send just one INITIALIZE request for the virtual controller. In Windows™, for example, the Windows™ port driver will send a single INITIALIZE request for the virtual controller.

A disclosed system employs a driver stack that includes a set of drivers that work in combination to fulfill all PNP, Power, and I/O requests sent by the OS to a RAID volume spanning multiple PCI/PCIe storage controllers. In at least one embodiment, the drivers include a virtual miniport driver (VMD), a storage controller bus driver (SCBD), and a storage protocol function driver (SPFD). Other embodiments may implement analogous functionality using more, fewer, or different combinations of drivers.

The SPFD may initialize controller & port registers and otherwise claim/control and receive all requests for the physical storage controllers/HBA. The SPFD may implement the applicable storage protocols and issue commands to the HBAs and the disks behind the HBAs. The SPFD may also process interrupts using ISR routines. Systems may employ a single SPFD that encompasses all applicable protocols. Alternatively, systems may employ multiple SPFDs, each handling a specific protocol.

The VMD, which may be configured to implement the RAID logic, may also be configured to process applicable requests including, as examples, initialization requests, PNP requests, Power requests, and I/O requests, for the protocol-specific virtual controller/HBAs and the LUNs exposed through those controller/HBAs.

The SCBD may be configured to virtualize all physical storage controllers/HBAs of a particular protocol into the virtual storage controllers/HBA for that protocol. The SCBD may also perform a routing function by routing requests it receives from the VMD to the appropriate SPFD.

By segregating the discovery and initialization of the physical controller/HBAs from the RAID stack initialization, disclosed subject matter better aligns the driver stack with the system architecture and better supports booting from a spanned RAID virtual disk. Disclosed embodiments employ the SPFD to perform HBA initialization and the VMD to perform RAID stack initialization. The SCBD separates the VMD and the SPFD and produces the virtual storage controller/HBA device object that marks completion of the physical storage controller/HBA initialization and triggers the loading of the VMD to perform RAID stack initialization.

The VMD, SCBD and SPFD may employ function callbacks and exported functions for communication during hibernation/crash-dump since the I/O Manager and PNP Manager may be non-functional in hibernation/crash context.

The SCBD and SPFD may notify the VMD of at least some configuration changes, including changes involving removal or insertion of disk(s) to update the RAID Core.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 7A-7C illustrate initialization flow during a normal boot in accordance with the present invention;

DETAILED DESCRIPTION

Figure 1:
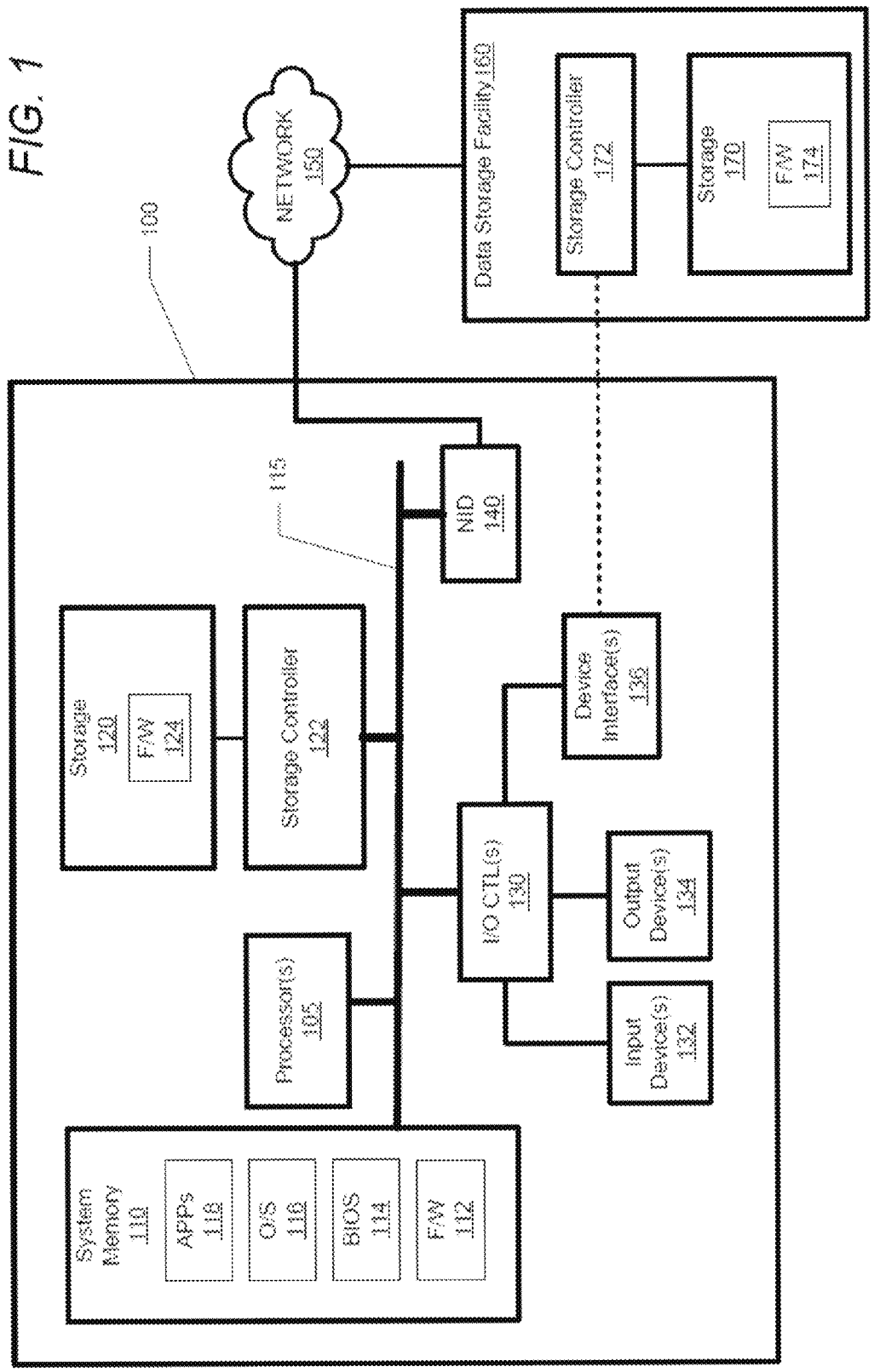
FIG. 1 illustrates an example information handling system (IHS) within which various aspects of the disclosure can be implemented.

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Disclosed embodiments support hibernation/crash-dump on a RAID virtual disk boot volume by employing a two-tiered discovery and initialization process in which the initialization of physical PCI/PCIe controller/HBAs, performed by a first driver, is segregated from the initialization of the RAID stack, performed by a second driver, using an intermediary driver that virtualizes all of the applicable physical storage controllers/HBAs initialized by the first driver and exposing a single virtual controller for the protocol to the second driver.

Disclosed methods may employ a protocol function driver to discover and initialize physical storage controllers/HBAs, a storage controller bus driver to virtualize all of the physical storage controllers of a particular protocol and expose a single virtualized controller for the applicable storage protocol, and a virtual miniport driver to discover and initialize one or more RAID stacks associated with a protocol-specific virtual storage controller. Each RAID virtual disk created from physical disks behind similar protocol-specific storage controllers/HBAs may be associated with a protocol-specific virtual controller/HBA.

In this manner, disclosed embodiments may, for example, initialize all physical PCI/PCIe storage controllers/HBAs associated with a RAID boot volume during hibernation/crash-dump even though the OS sends only one initialization request for the virtual storage controller/HBA.

FIG. 1 illustrates a block diagram representation of an example IHS 100, within which any one or more described features of the various embodiments of the disclosure can be implemented. For purposes of this disclosure, an IHS, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a handheld device, personal computer, a server, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various I/O devices, such as a keyboard, a mouse, and a video display. The IHS may also include one or more buses operable to transmit communications between the various hardware components.

Referring specifically to FIG. 1, example IHS 100 includes one or more processor(s) 105 coupled to system memory 110 via system interconnect 115. System interconnect 115 may be referred to herein as a system bus. Also coupled to system interconnect 115 is a storage controller 122 coupled to storage 120 within which can be stored software and/or F/W 124 and one or more sets of data (not specifically shown). As shown, system memory 110 can include therein a plurality of modules, including F/W 112, basic input/output system (BIOS) 114, OS 116 and application(s) 118. The various software and/or F/W modules have varying functionality when their corresponding program code is executed by processor(s) 105 or other processing devices within IHS 100.

IHS 100 further includes one or more I/O controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s), such as a compact disk (CD), digital video disk (DVD), flash drive, or flash memory card. In one or more embodiments, device interface(s) 136 can also provide an integration point for connecting other device(s) to IHS 100. In such implementation, device interface(s) 136 can further include General Purpose I/O interfaces such as I2C, SMBus, and PCI buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of hard disk drives, solid state storage drives, solid state storage devices or other storage media. In at least one embodiment, data storage facility 160 is or includes support for a RAID storage. Data storage facility 160 includes a storage controller 172 coupled to storage 170 within which can be stored software and/or F/W 174 and one or more sets of data (not specifically shown). In an alternate embodiment, and as represented by the second set of dashed interconnecting lines, data storage facility 160 can be directly connected to IHS 100 as an external storage device.

Figure 2:
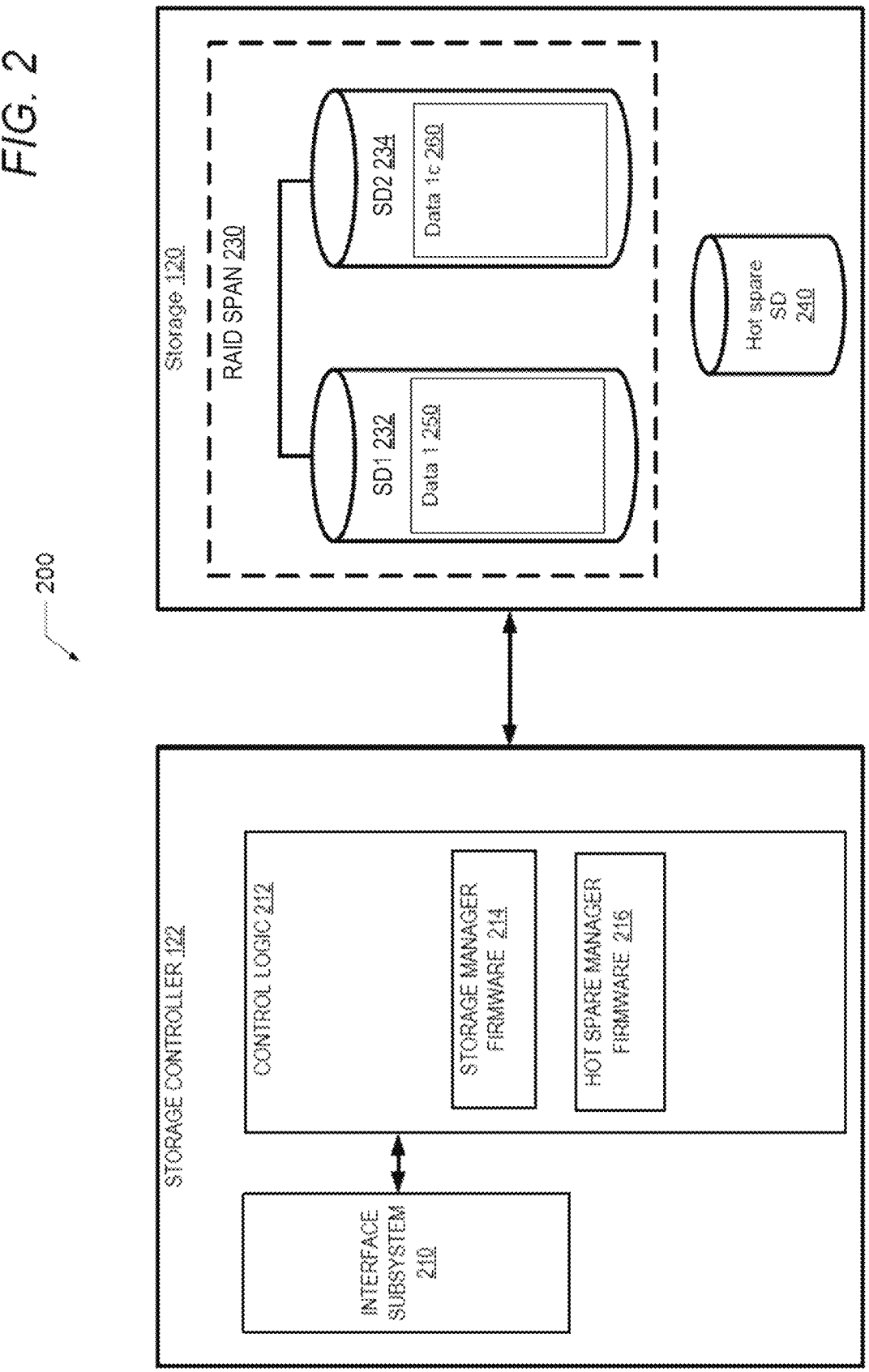
FIG. 2 illustrates a block diagram of an example storage system.

With reference now to FIG. 2, there is illustrated one embodiment of storage system 200 that can be utilized as a subsystem of IHS 100 and/or data storage facility 160 to store data, software and F/W. In the discussion of FIG. 2, reference is also made to elements described in FIG. 1. Storage system 200 generally includes storage 120 and storage controller 122 that controls and manages the flow of commands and data to and from storage 120. Storage system 200 can also represent storage 170 and storage controller 172 of data storage facility 160.

In one embodiment, storage 120 includes a RAID span 230 comprising multiple storage drives including SD1 232 and SD2 234. While the illustrated RAID group 230 spans two storage drives, RAID span 230 may include more storage drives. In the RAID1 configuration illustrated in FIG. 2, SD2 234 contains a copy or mirror image 260 of the data 250 stored in SD1 232. Other embodiments may employ a different RAID level using a different number of storage drives. Storage 120 can include hundreds of RAID spans encompassing many hard disk drives or solid state drives in each span.

The storage 120 illustrated in FIG. 2 further includes one or more hot spare storage device(s) 240. Hot spare storage device 240 is a storage device that may be used to replace a failing or failed storage device in a RAID system. The hot spare storage device 240 may reduce the mean time to recovery for a RAID span, thus reducing the probability of a second disk failure and the resultant data loss that would occur in any singly redundant RAID system such as a RAID 1 system. For example, hot spare storage device 240 can replace either SD1 232 or SD2 234 if either of the storage devices were to fail.

Storage controller 122 contains the logic necessary to read and write to storage 120. The illustrated storage controller 122 includes an interface subsystem 210 and control logic 212. Interface subsystem 210 may manage communications between control logic 212 and system interconnect 115 (FIG. 1). Control logic 212 may include several functional modules or processes including storage manager F/W 214 and hot spare manager F/W 216. Functions, modules, routines, methods and processes of the present disclosure can be provided as F/W code and/or logic within storage controller 122. The F/W code and logic can implement storage manager F/W 214 and hot spare manager F/W 216.

Storage manager F/W 214 manages the reading and writing of data to storage 120 and can support data distribution techniques to improve storage reliability such as RAID. Storage manager F/W 214 may use RAID technology to group the drives within storage 120 into RAID sets. Hot spare manager F/W 216 may manage the rebuilding of data in hot spare storage device 240 when one or more storage devices within storage 120 fail.

Those of ordinary skill in the art will appreciate that the hardware components and basic configuration depicted in FIGS. 1 and 2 and described herein may vary. For example, the components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
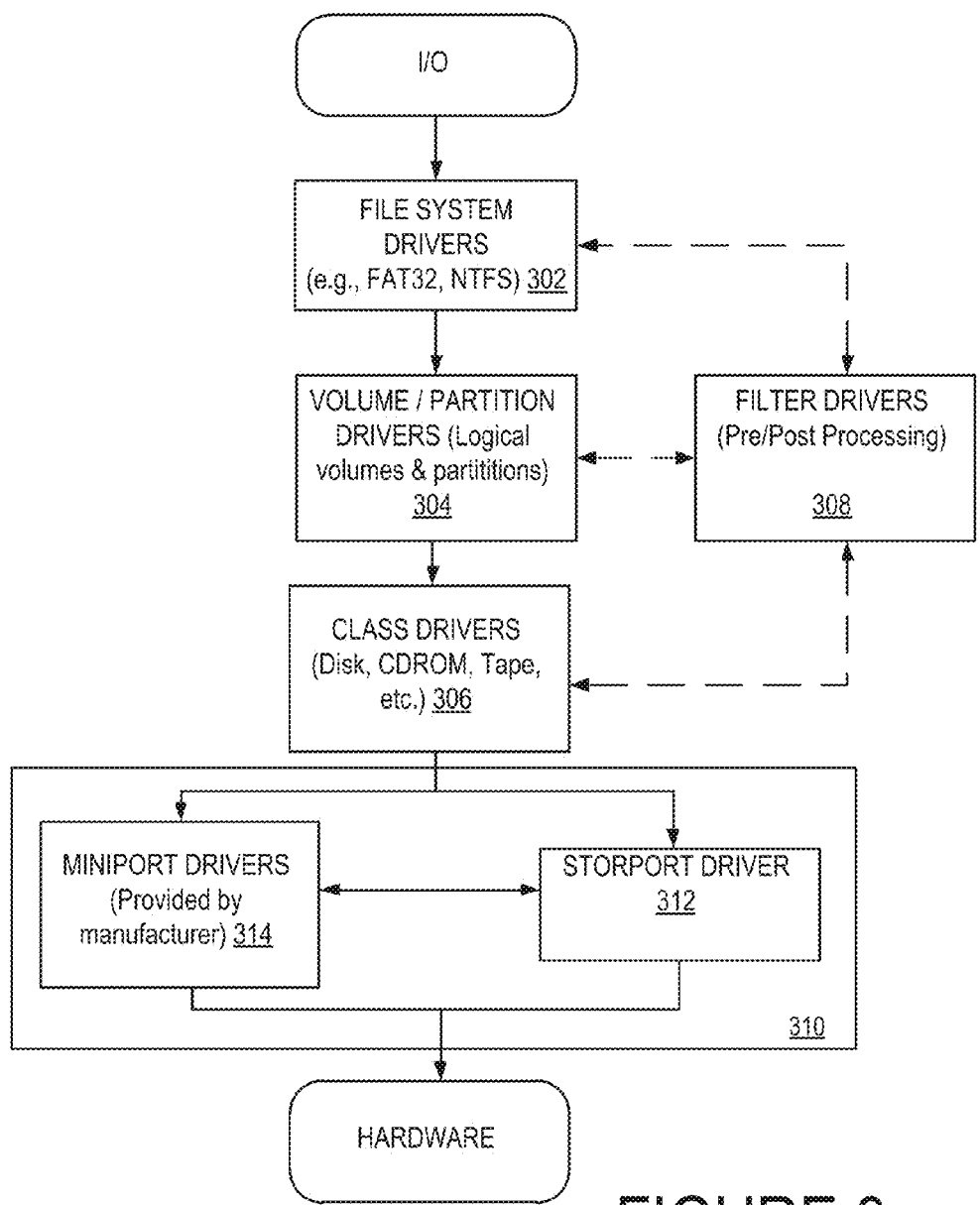
FIG. 3 illustrates a normal state I/O path.
Figure 4:
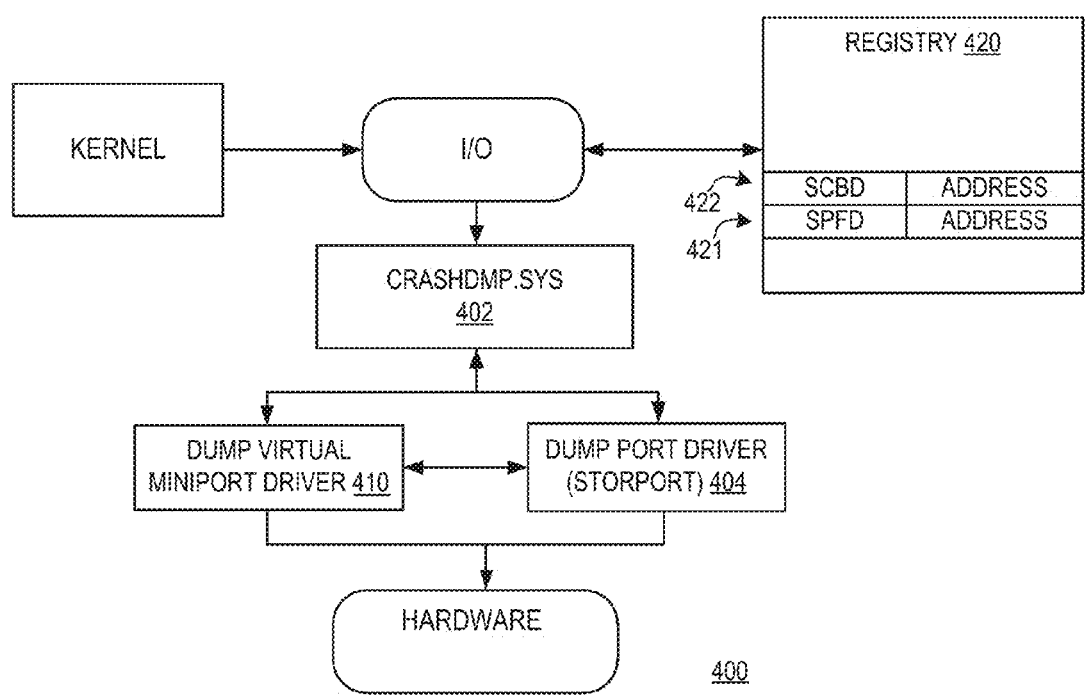
FIG. 4 illustrates a crash-dump/hibernation I/O path.

FIG. 3 and FIG. 4 emphasize distinctions in the I/O path of an IHS such as IHS 100 (FIG. 1) during "normal" operation, represented by FIG. 3, and the I/O path employed during crash-dump/hibernation, represented by FIG. 4. The normal I/O path 300 illustrated in FIG. 3, includes one or more file system driver(s) 302, volume partition driver(s) 304, class drivers 306, and filter driver(s) 308 that interact with drivers 302, 304, and/or 306. The normal I/O path 300 illustrated in FIG. 3 further includes port driver(s) 310 including storport driver(s) 312 and miniport driver(s) 314.

In contrast to the normal I/O path 300, the hibernation/crash-dump I/O path 400 illustrated in FIG. 4 reflects: (1) the lack of a functioning PNP manager and I/O manager during hibernation/crash-dump, (2) all disk I/O occurs synchronously during hibernation/crash-dump and (3) a limited set of drivers are active. The hibernation/crash-dump I/O path 400 illustrated in FIG. 4 includes a crash-dump driver (crashdump.sys) 402 and a dump port driver pair including a dump port driver 404 and a dump virtual miniport driver 410. FIG. 4 further illustrates that, during hibernation/crash-dump, the system reads address values from SPFD entry 421 and SCBD entry 422 in registry 420 to load the corresponding drivers.

Figure 5:
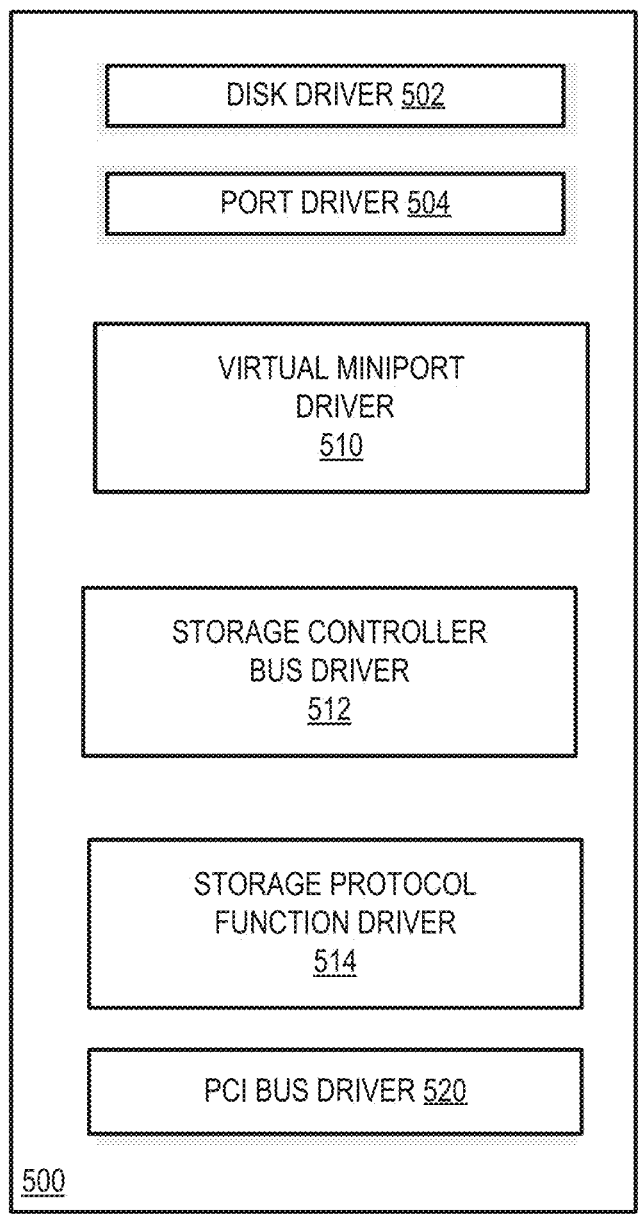
FIG. 5 illustrates a high-level driver stack.
Figure 6:
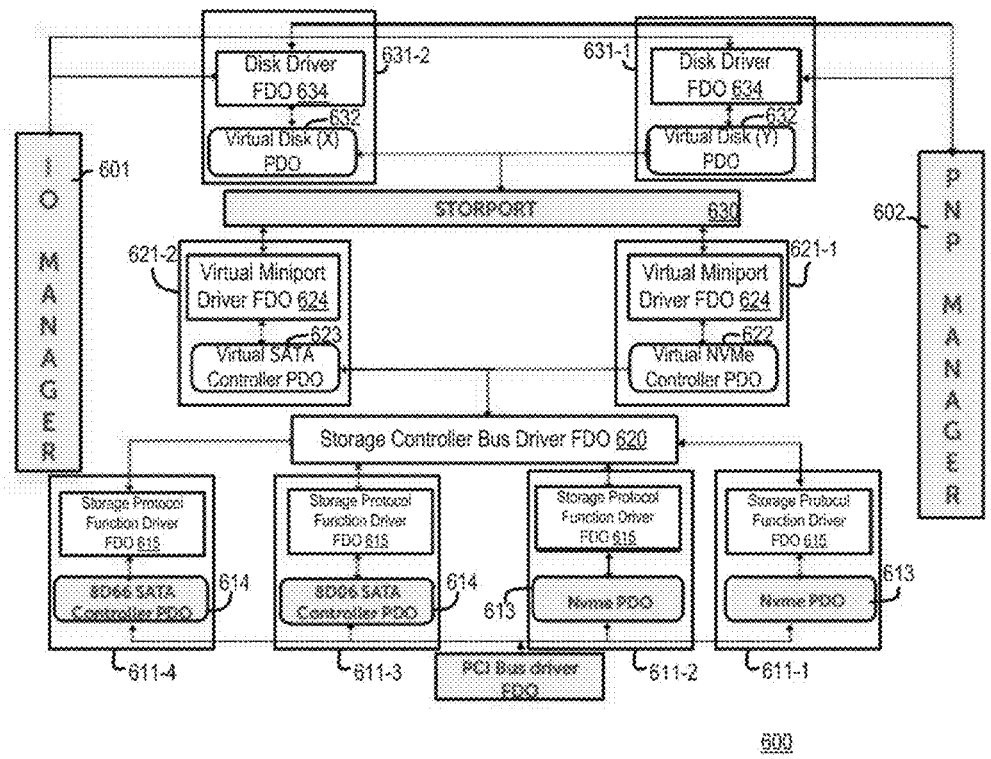
FIG. 6 illustrates a device stack architecture in accordance with the present invention.

FIG. 5, which illustrates a high level driver architecture 500 in accordance with embodiments of information handling systems disclosed herein, and FIG. 6, which illustrates an example device tree 600 in accordance with the driver architecture 500, are explained in greater detail with respect to four operational sequences illustrated in FIGS. 7A-7C, 8, 9A-9B, and 10A-C.

The driver architecture 500 illustrated in FIG. 5 includes a disk driver 502, a port driver 504, VMD 510, SCBD 512, SPFD 514, and a PCI bus driver 520. The device tree 600 illustrated in FIG. 6 includes physical controller device stacks 611, virtual controller device stacks 621, and virtual disk stacks 631. The physical controller device stacks 611 includes NVMe device stacks 611-1 and 611-2 and SATA controller device stacks 611-3 and 611-4. NVMe device stacks 611-1 and 611-2 each include an NVMe physical device object 613 and an SPFD functional device object 615. SATA controller device stacks 611-3 and 611-4 each include an 8D66 SATA Controller device object 614 and an SPFD functional device object 615.

The virtual controller device stacks 621 are protocol-specific device stacks that include a virtual NVMe controller device stack 621-1 and a virtual SATA controller device stack 621-2. The virtual NVMe controller device stack 621-1 includes a virtual NVMe controller physical device object 622 and a virtual miniport driver function driver object 624 while the virtual SATA controller device stack 621-2 includes a virtual SATA controller physical device object 623 and a virtual miniport driver object function driver object 624. The virtual disk device stacks 631 each includes a virtual disk PDO 632 and a disk driver FDO 634.

During startup, PNP manager 602 may request PCI Bus Driver 520 to enumerate PCI devices on the PCI Bus, at which point PCI bus driver 520 creates physical device objects 613 for the NVMe controllers and physical device objects 614 of the SATA controllers. PnP manager 602 may then associate a device node with each newly created PDO and looks in the registry to determine which drivers need to be part of the device stack for the node. Each device stack may be associated with a single function driver and zero or more filter drivers. As each driver is loaded, a corresponding device object is created within the device stack. Thus, each device stack 611 includes a functional device object corresponding to the applicable function driver. The device tree 600 illustrated in FIG. 6 includes an NVMe physical driver object 613 and an SPFD functional driver object 615 for NVMe device stacks 611-1 and 611-2 and a SATA physical driver object 614 and SPFD functional drive object 615 for SATA device stacks 611-3 and 611-4.

The SPFD functional driver objects 615 may implement the applicable storage protocols to packetize and send down commands to the physical controllers represented by physical device objects 613 and 614. The SPFD functional driver objects 615 may also register interrupt handlers and process interrupts for the PCI/PCIe devices. In addition, the SPFD functional driver objects may expose function callbacks and exported functions used for communication during hibernation/crash-dump sequences.

The device tree 600 illustrated in FIG. 6 includes an SCBD functional driver object 620. Each SCBD FDO 620 may virtualize the underlying protocol-specific controllers/HBAs to expose a single virtual Storage HBA per protocol. In FIG. 6, for example, SCBD FDO 620 virtualizes the two NVMe device stacks 611-1 and 611-2 and exposes a single virtual NVMe controller represented by virtual NVMe controller PDO 622. Similarly, SCBD FDO 620 virtualizes the two SATA device stacks 611-3 and 611-4 and exposes a signal virtual SATA controller PDO 623.

In addition to virtualizing the physical storage controller/HBAs, the SCBD FDO 620 illustrated in FIG. 6 may route I/O requests to the appropriate protocol-specific functional driver objects. Like the SPFD functional driver objects 615 and 616, SCBD FDO 620 may also expose function callbacks and exported functions used for communication during hibernation/Crash-dump.

In the device tree 600 illustrated in FIG. 6, each protocol-specific virtual controller device stack 621 includes a VMD FDO 624 corresponding to VMD 510 in FIG. 5. In at least one embodiment, each VMD FDO 624 initializes the corresponding virtual controller PDO (622, 623) created by the SCBD FDO 620. Each VMD FDO 624 may also read metadata and expose virtual disks for each virtual controller 622, 623 where each virtual disk is created across multiple disks that support the applicable protocol. VMD 510, through VMD FDOs 624, may also implement the applicable RAID logic and perform normal I/O and error handling, as well as, exposing function callbacks & exported functions used for communication during Hibernation/Crash-dump.

The storport FDO 630 and the corresponding storport driver 504 of FIG. 5 may expose the virtualized RAID volumes to the inbox disk driver 502 and the corresponding disk driver FDOs 634 for I/O and PNP operations via I/O manager 601 and PNP manager 602. Disk driver 502 and the corresponding disk driver FDOs 634 may claim the applicable virtual disk 632 and sends read/write, PNP/Power and initialization requests for the virtual disk PDOs 632.

Figure 7A:
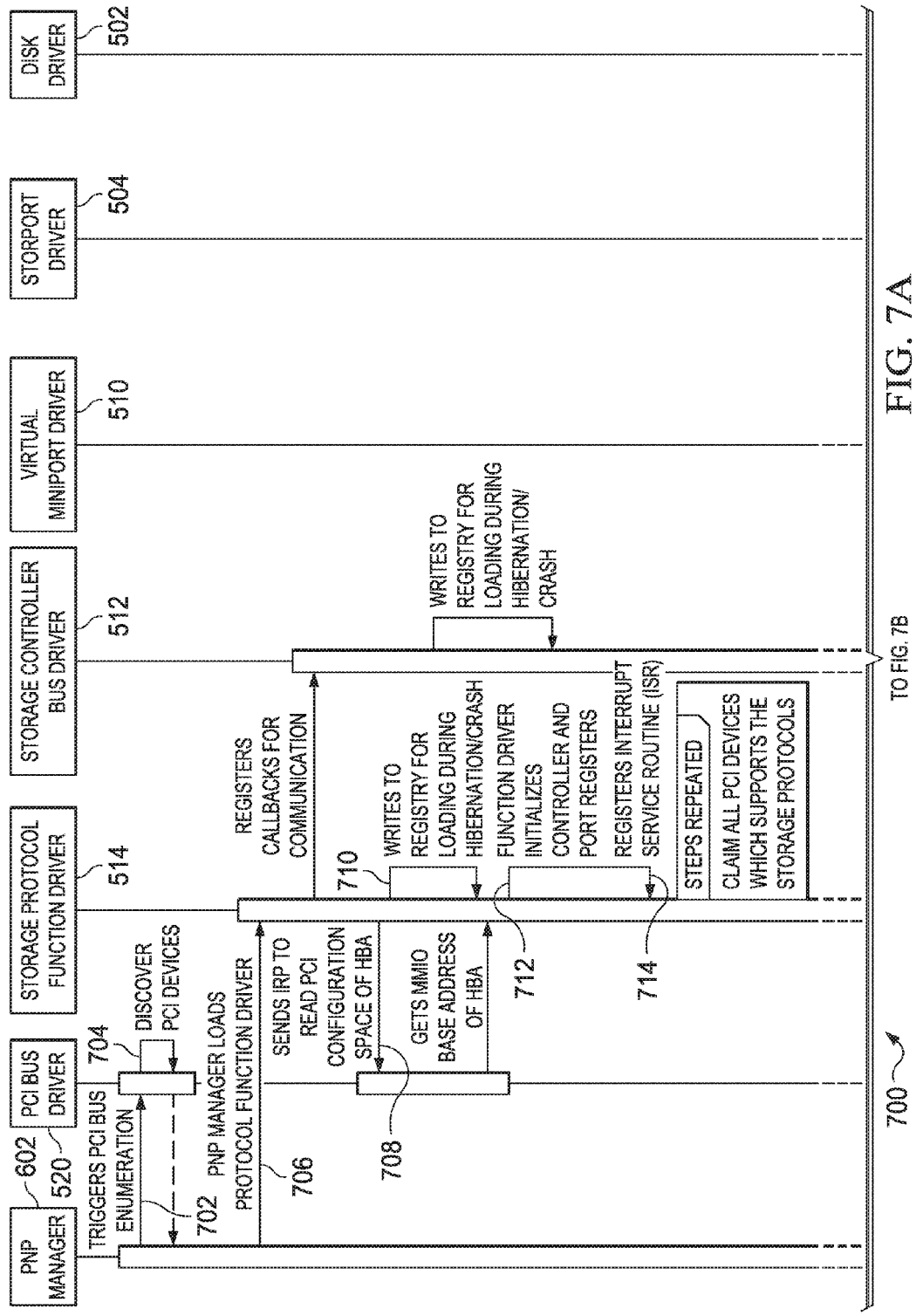
Figure 7C:
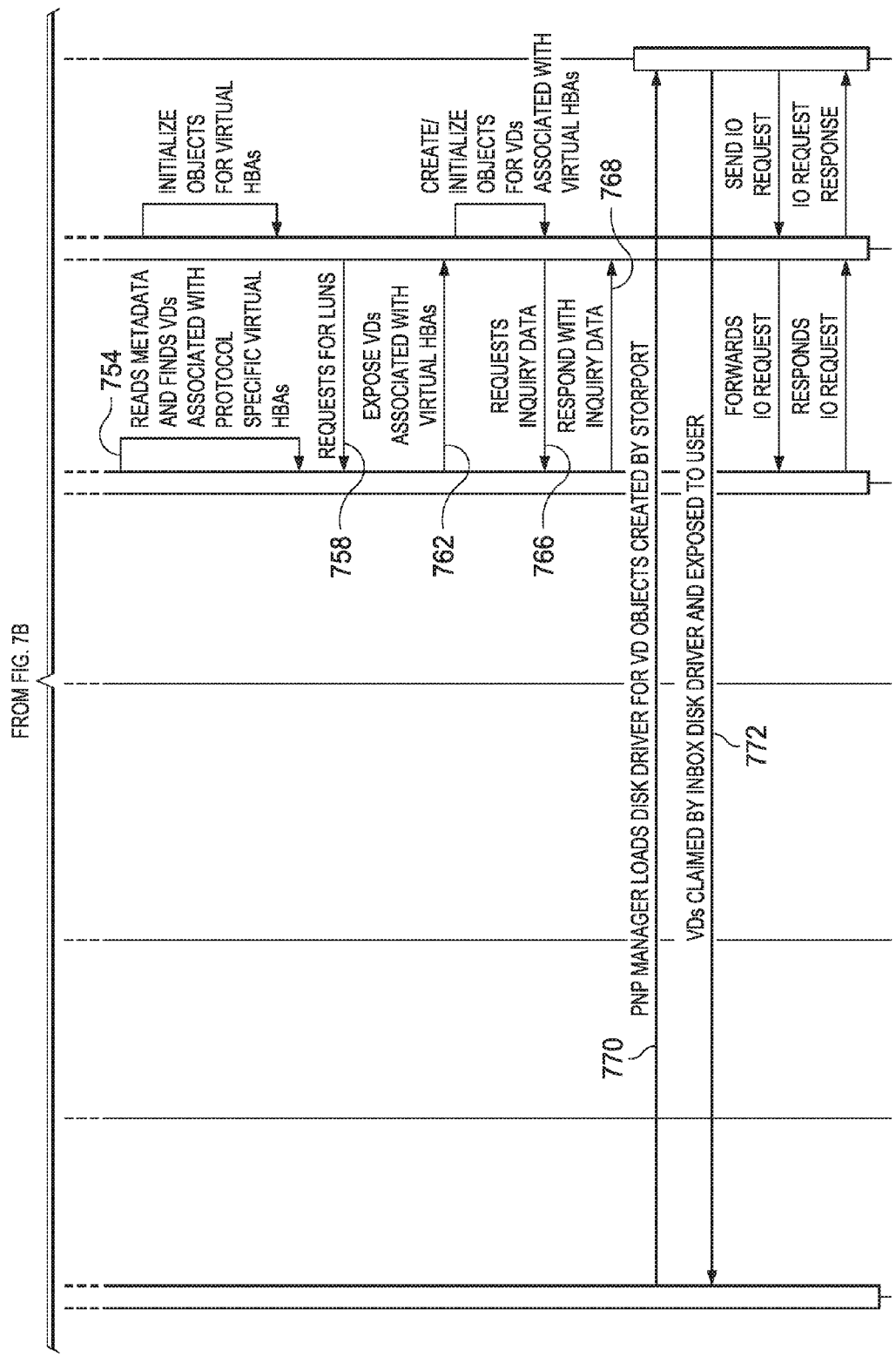

FIGS. 7A-7C illustrate an example system initialization flow 700 during normal boot in accordance with disclosed embodiments. As depicted in FIGS. 7A-7C, system initialization flow 700 includes PNP manager 602 requesting (operation 702) PCI Bus Driver 520 to enumerate the PCI/PCIe storage controller/HBA devices. PCI bus driver 520 discovers (operation 704) devices connected to the PCI bus and creates corresponding physical controller PDOs 611. PNP manager 602 may then load (operation 706) SPFD 514, which may then read (operation 708) the PCI configuration space of the controller PDOs (613, 614) from PCI Bus driver 520. SPFD 514 may also write (operation 710) to the Windows™ registry for loading the SPFD during hibernation/crash, initialize (operation 712) the controller and port registers, and performs interrupt service routine (ISR) registration (operation 714). Operations 708 through 714 are performed for each storage controller/HBA discovered during operation 704.

After SPFD 514 notifies (operation 716) SCBD 512 that all discovered devices have been registered, SCBD 512 virtualizes (operation 720) the storage controller/HBAs and exposes a single virtual storage controller/HBA per protocol. SCBD 512 may also store (operation 722) information pertaining to each virtual storage controller/HBA to the registry to enable the OS kernel to load the virtual storage controller/HBA during hibernation/crash. SCBD may notify (operation 726) PNP manager 602 that the Root Bus Relation changed, whereupon PNP manager 602 may request (operation 730) additional information regarding the virtual controller/HBAs and SCBD 512 responds by providing (operation 734) PNP manager 602 with the additional information.

The initialization sequence 700 illustrated in FIGS. 7A-7C further includes PNP manager 602 loading (operation 738) VMD 512 as VMD FDO's 624 to claim the virtual storage controller/HBAs represented in FIG. 6 by virtual NVMe controller/HBA PDO 622 and SATA controller/HBA 623. VMD 510 may register (operation 742) with storport driver 504, represented by storport FDO 630 in the device tree 600, and initialize (operation 750) the virtual storage controller/HBAs as requested (operation 746) by storport driver 504.

VMD 510 may then read (operation 754) metadata information from disks and associate virtual disks with the protocol-specific virtual storage controllers/HBAs. As part of this operation VMD 510 may configure the applicable storage controllers/HBAs with the appropriate RAID configuration.

When the storport driver 504 then requests (operation 758) LUN information, VMD 510 exposes (operation 762) the LUNs through the protocol-specific virtual controller/HBAs. Storport driver 504 may then send (operation 766) a request for INQUIRY data to VMD 510. VMD 510 may then respond (operation 768) to the INQUIRY request, after which PNP Manager 602 loads (operation 770) disk driver 502, which claims (operation 772) the virtual disks exposed by operation 762.

Figure 8:
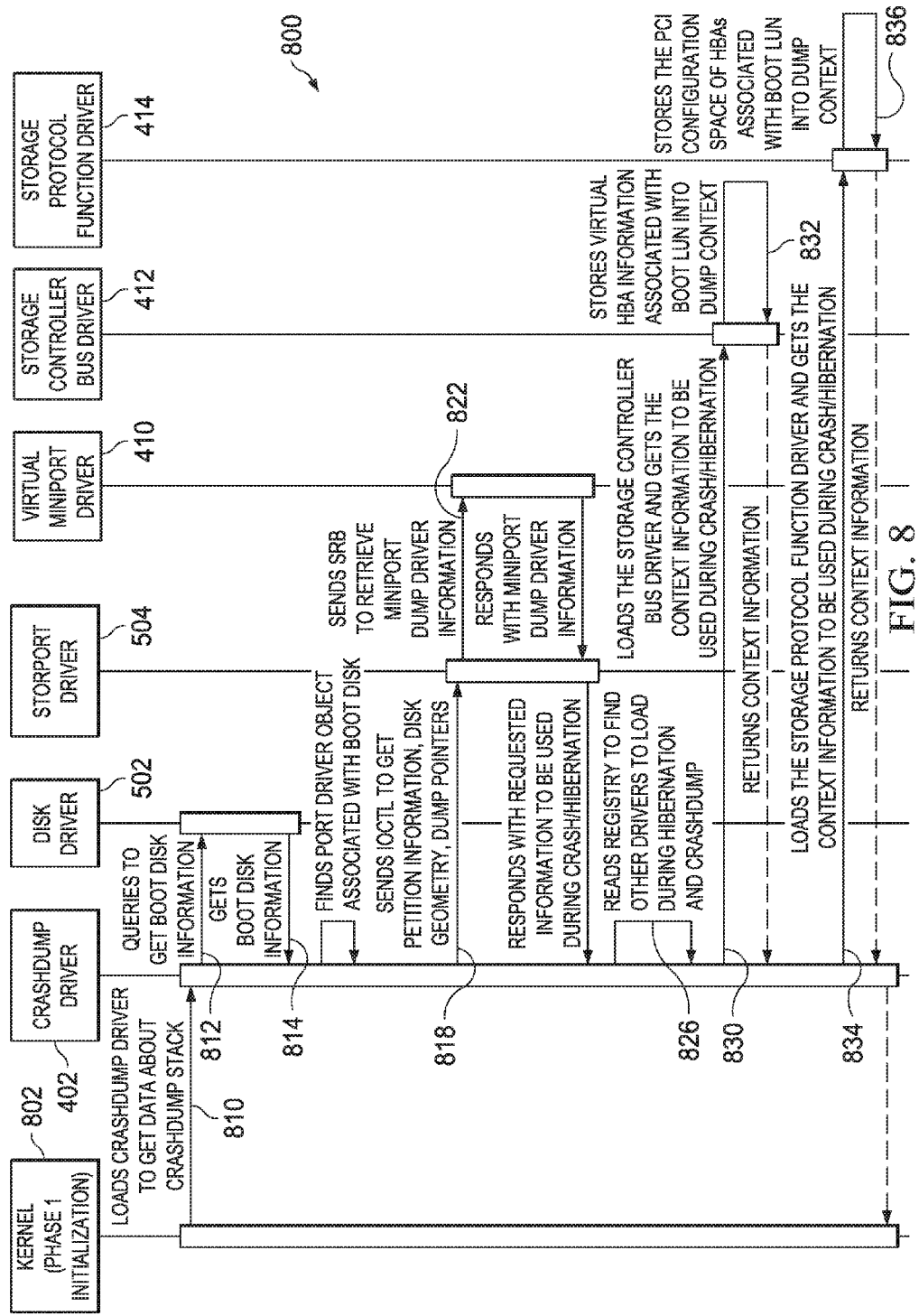
FIG. 8 illustrates crash-dump hibernation stack initialization during normal boot.

FIG. 8 illustrates an example initialization 800 of a crash-dump/hibernation stack that may occur during a normal boot. The crash-dump/hibernation stack initialization 800 illustrated in FIG. 8 includes an initialization phase during which the OS kernel 802 loading (operation 810) the crash-dump driver 402 to obtain crash-dump stack information required to load drivers and perform I/O when crash or hibernation occurs. Kernel 802 may then obtain (operation 812) the boot disk info from disk driver 502 and find (operation 814) the port driver object from the boot disk. Once the port diver object is found, kernel 802 may send (operation 818) an I/O control (IOCTL) to storport driver 504 to get partition info, disk geometry information, and crash-dump pointers.

Storport driver 504 may send (operation 822) a SCSI request block (SRB) to fetch information for the dump virtual miniport driver 410. The crash-dump driver 402 may then read (operation 826) the registry to load (operation 830) SCBD 512 and gather its dump context information for use in the event hibernation or crash occurs. SCBD 512 may store (operation 832) virtual controller/HBA information associated with the boot LUN into the crash-dump context. Similarly, crash-dump driver 402 may read (operation 834) the registry to load SCBD 512 and gather its dump context information for use in the event hibernation or crash occurs. SPFD 514 may store (operation 836) the PCI configuration space of storage controller/HBAs associated with the boot LUN into the crash-dump context.

Figure 9A:
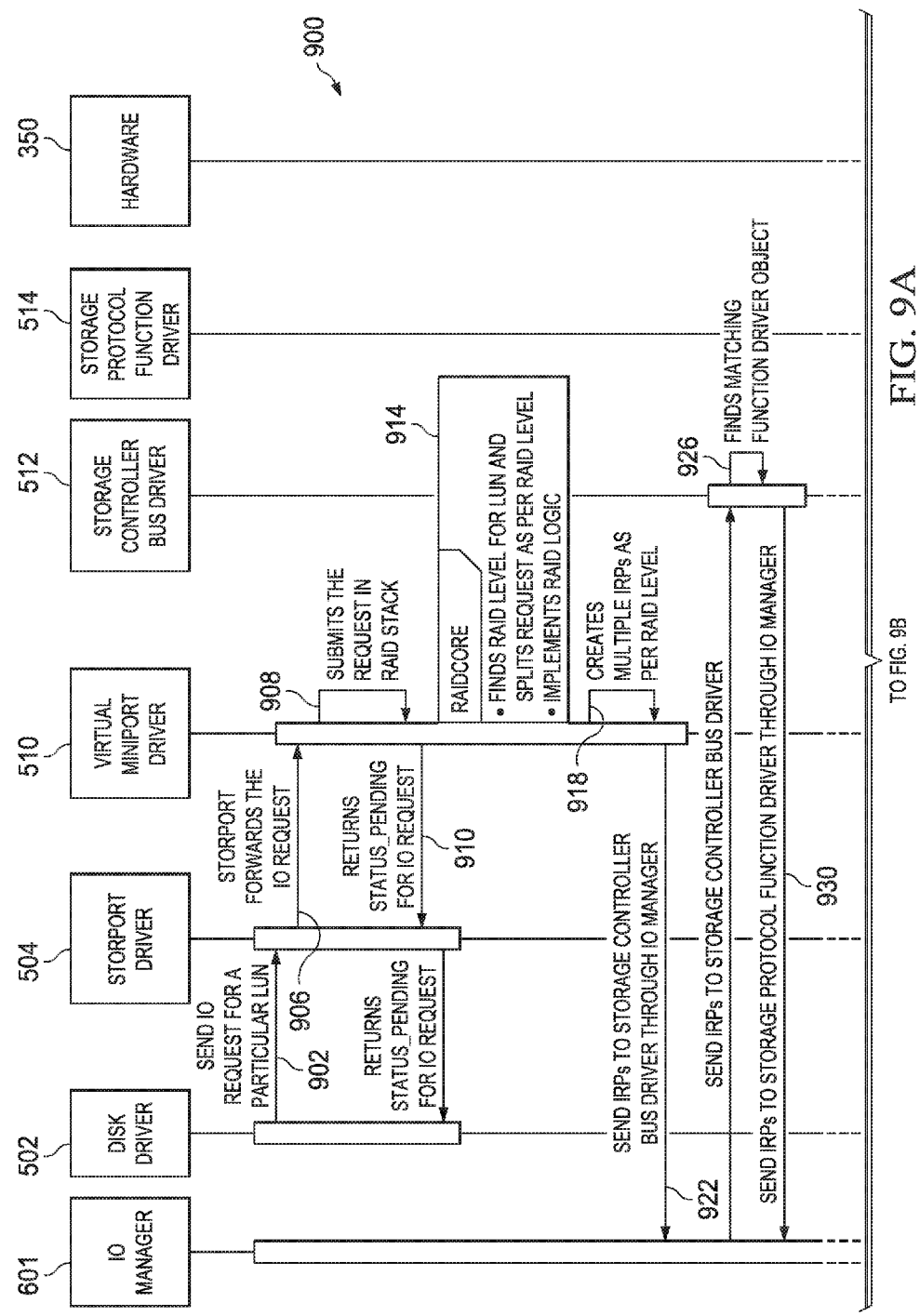
FIGS. 9A-9B illustrate a normal I/O request.
Figure 9B:
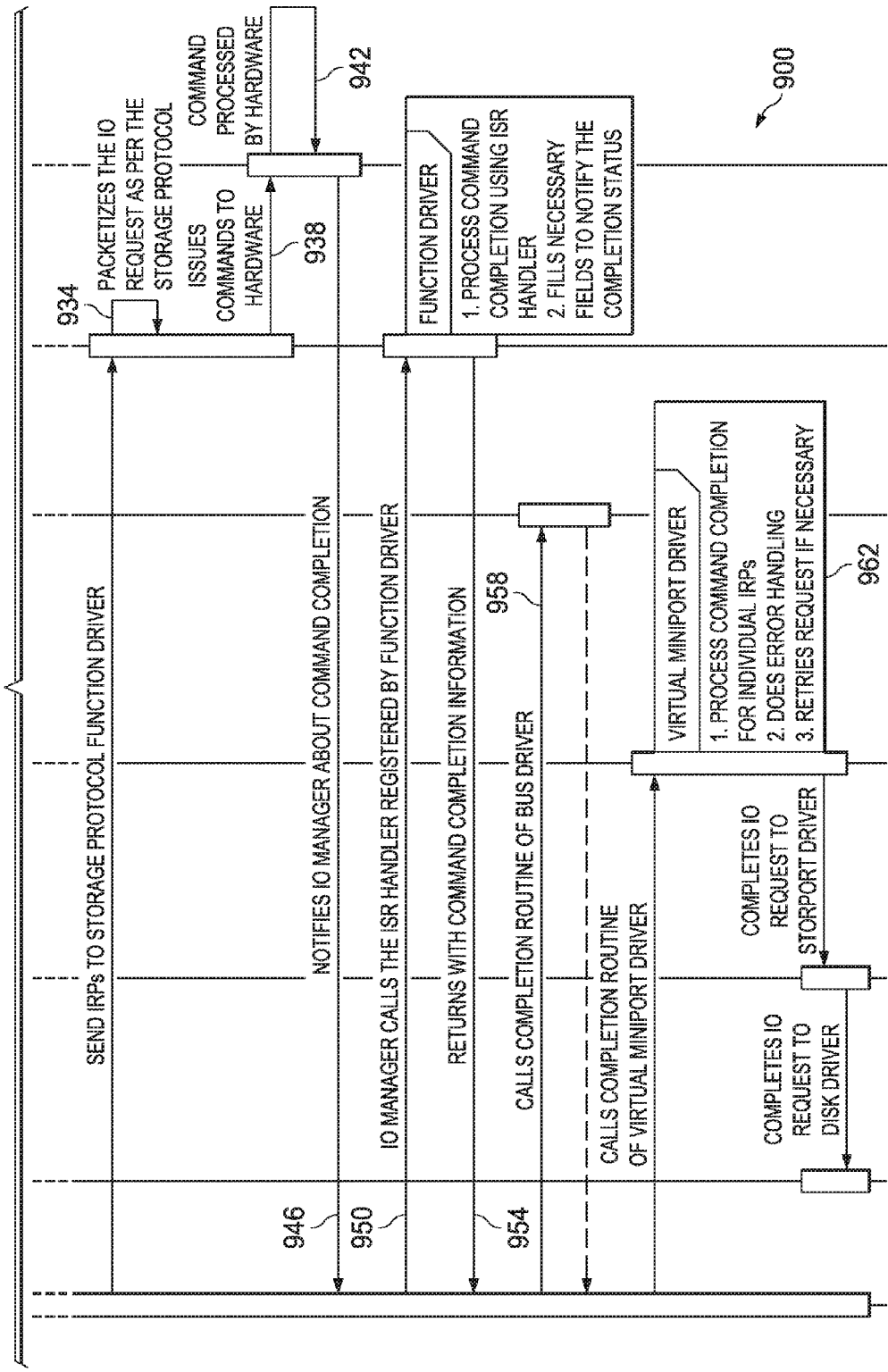

FIGS. 9A and 9B illustrate an I/O request flow 900 during normal operation in accordance with disclosed embodiments. Disk driver 502 sends (operation 902) storport driver 504 an I/O request for a particular LUN. Storport driver 504 forwards (operation 906) the I/O request to the virtual miniport driver 510. The virtual miniport driver 510 returns (operation 910) a STATUS PENDING corresponding to the I/O request to storport driver 504 and submits (operation 908) the I/O request to the RAID stack. The RAID stack finds (operation 914) a RAID level for the LUN identified in the I/O request and splits (operation 918) the I/O request into multiple I/O request packets (IRPs) based on RAID Level. The resulting IRPs are then sent (operation 922) down to SCBD 512, which finds (operation 926) the correct SPFD stack into which to send (operation 930) the IRPs for processing. The SPFD 514 forms (operation 934) the protocol-specific packet and issues (operation 938) the command to hardware 350, which processes (operation 942) command completion. The request completion is then pushed (operation 946) up across driver layers, including the SPFD 514 which may have registered a command completion ISR. I/O manager 601 may then call (operation 950) the applicable ISR registered with SPFD 514, which may return (operation 954) command completion information. I/O manager 601 may also call (operation 958) a call completion routine associated with the SCBD 512 before calling (operation 962) a call completion routine associated with VMD 510. In addition to processing command completion for individual IRPs associated with the I/O request, VMD 510 may perform any error handling and may, if necessary, retry (operation 962). The original requester gets notified once the request is complete.

Figure 10A:
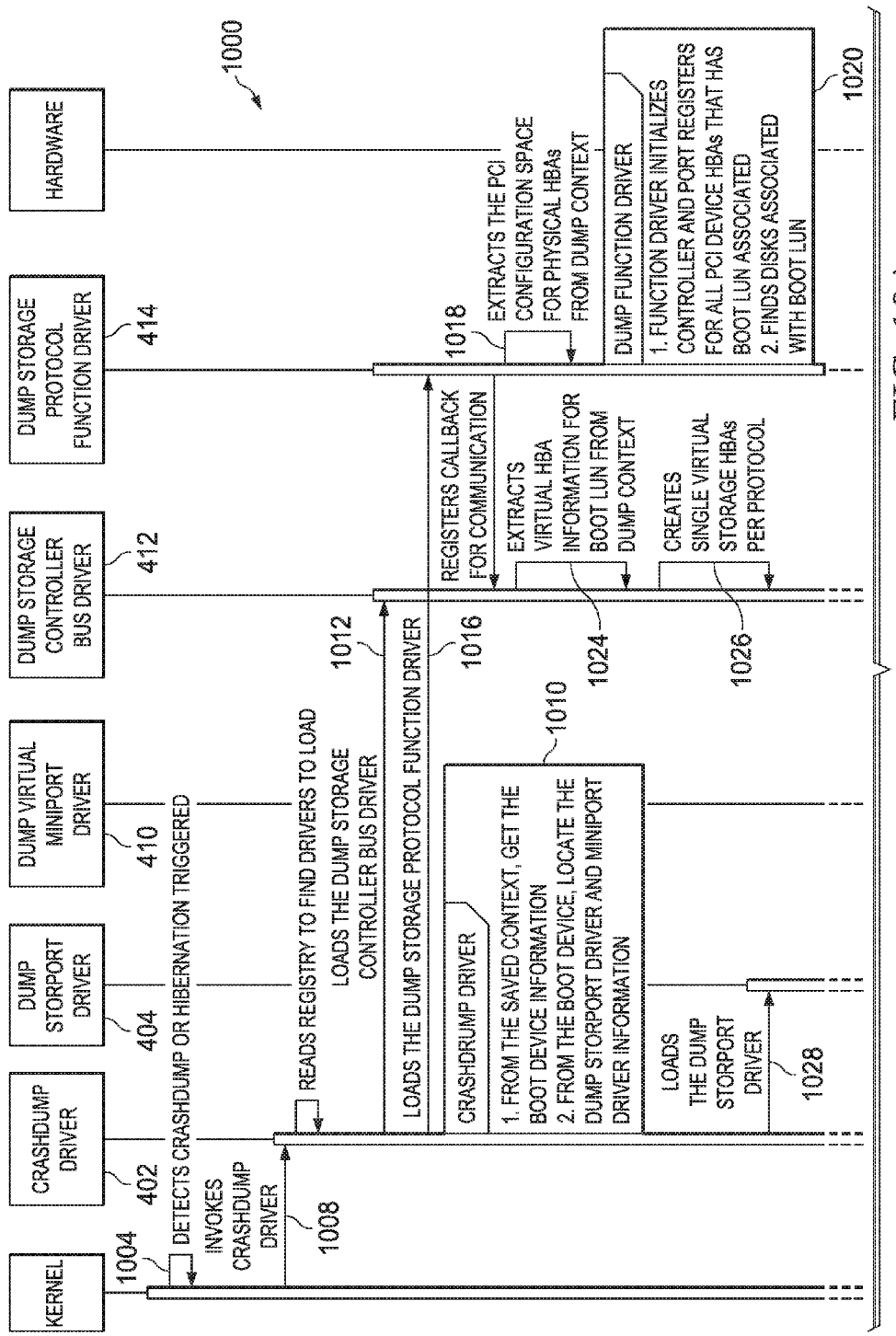
FIGS. 10A-10C illustrate crash-dump hibernation I/O after crash/hibernation occurred in accordance with the present invention.
Figure 10B:
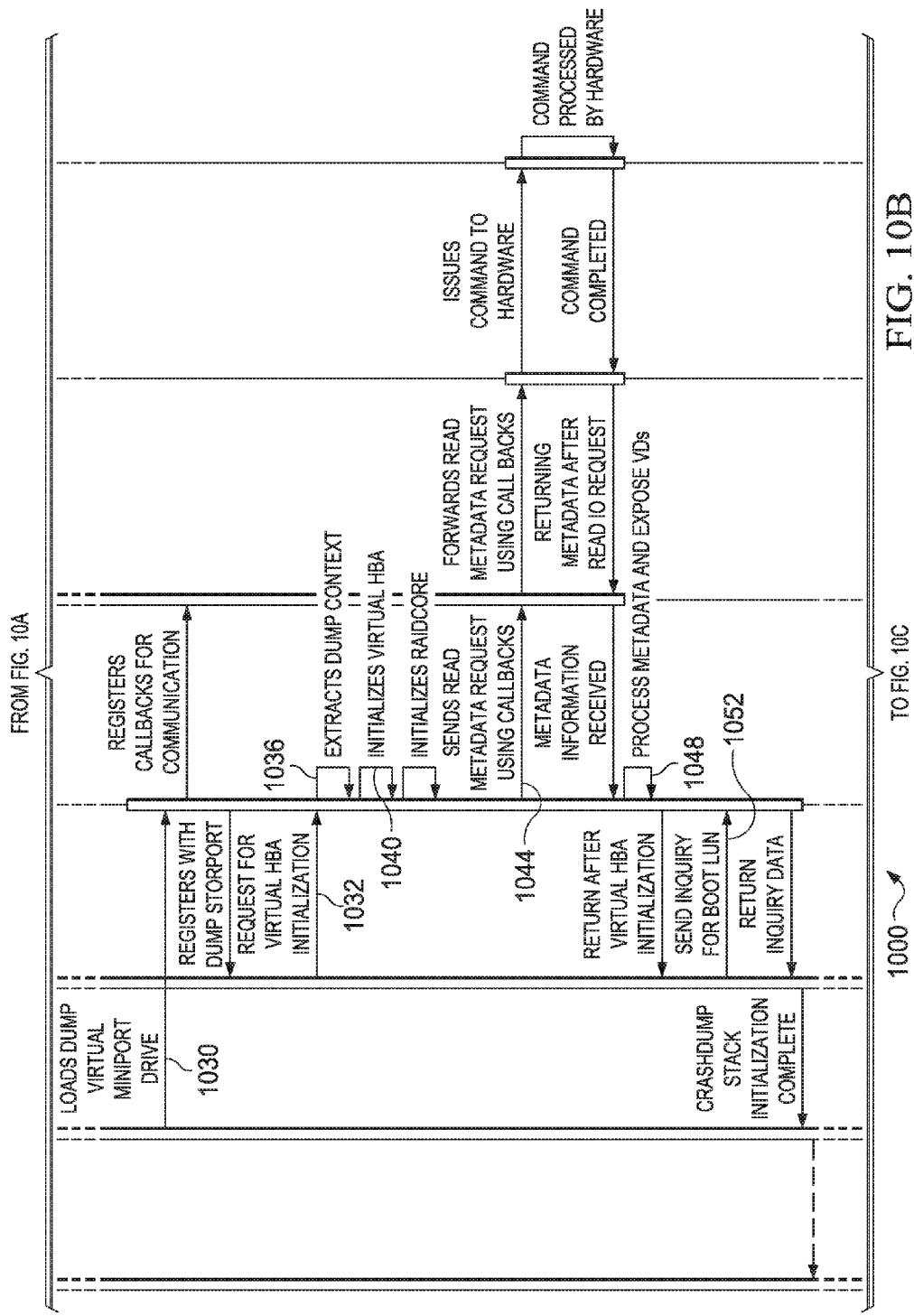
Figure 10C:
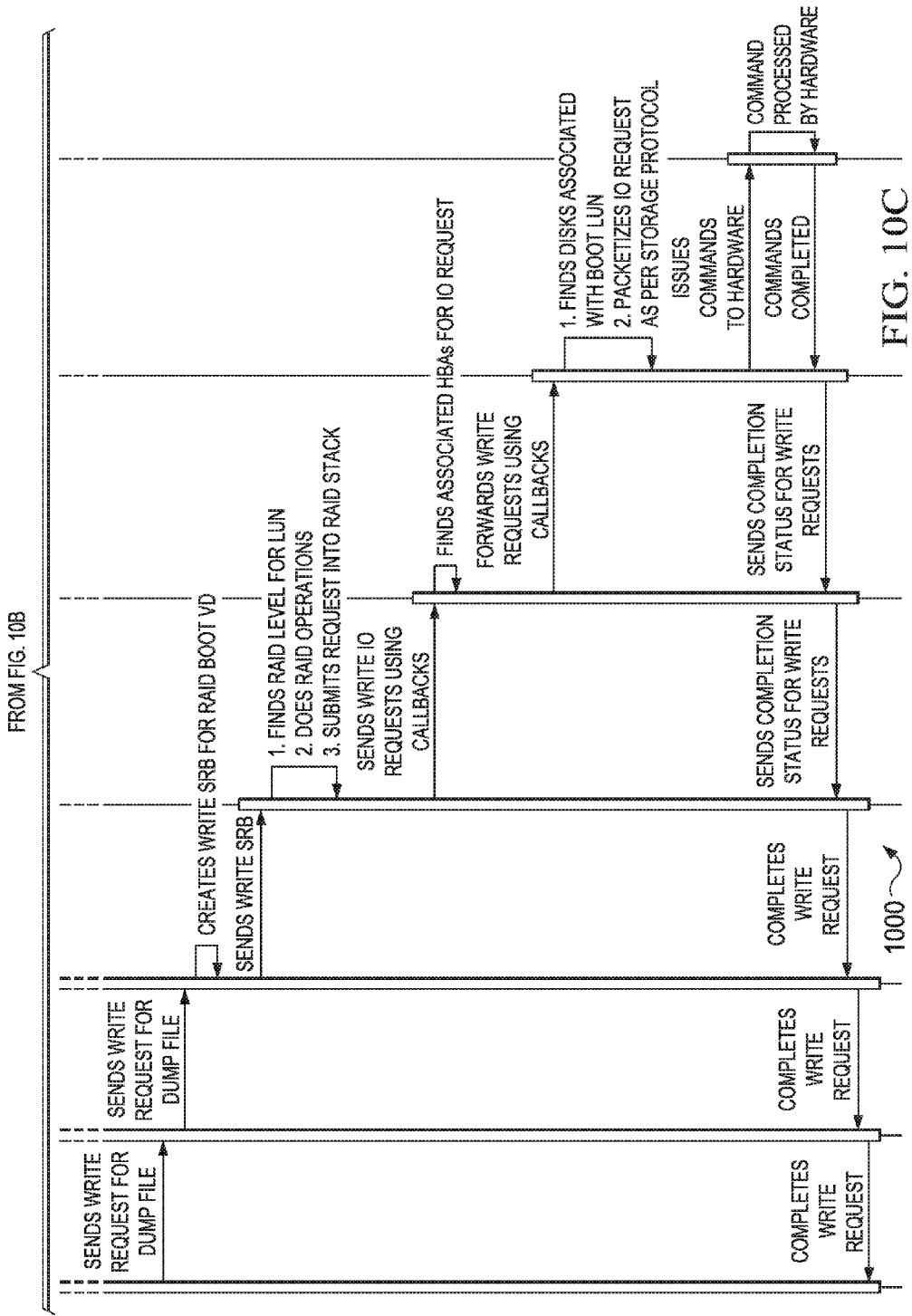

FIGS. 10A-10C illustrate an example crash-dump/hibernation initialization 1000 and I/O path following a crash or hibernation. Following kernel detection (operation 1004) of a crash dump or hibernation trigger, the kernel invokes (operation 1008) crash dump driver 402, which reads the registry to identify the appropriate drivers to load. Crash dump driver 402 may retrieve (operation 1010) boot device information from the previously saved crash dump context. The retrieved information may include information identifying a boot device. From the identified boot device, crash dump driver 402 may locate the dump port driver 404 and the dump virtual miniport driver 410.

In the initialization flow 1000 illustrated in FIGS. 10A-10C, the crash dump driver loads (operation 1012) the dump SCBD 412 and loads (operation 1016) the dump SPFD 414. The dump SPFD 414 may extract (operation 1018) the PCI configuration space for physical storage controller/HBAs from the dump context and initialize (operation 1020) controller and port registers for all PCI storage controller/HBAs associated with the boot LUN.

The dump SCBD 412 may then extract (operation 1024) virtual storage controller/HBA information for the boot LUN from the dump context and create (operation 1026) a single virtual storage controller/HBA for each protocol.

The crash dump driver 402 may then load (operation 1028) the dump storport driver 404 and load (operation 1030) the dump VMD 410. The dump VMD 410 and dump SPFD 414 may register callback functions with dump SCBD 412 for communicating since the I/O Manager 601 and PNP manager 620 are not functional following a crash dump trigger.

Dump storport driver 404 may request (operation 1032) the dump VMD 410 to initialize the virtual storage controller/HBAs and dump VMD 410 may extract (operation 1036) and initialize (operation 1040) the virtual storage controller/HBAs and the RAID core.

The dump VMD 410 may then send (operation 1044) a READ metadata request that is forwarded, via callbacks, through dump SCBD 412 and dump SPFD 414 to hardware 350 wherein the applicable command is processed and the metadata is returned to dump VMD 410. Dump VMD 410 may then process the returned metadata and expose (operation 1048) virtual disks through the virtual storage controller/HBA associated with Boot LUN to complete the request to initialize the virtual storage controller/HBA. The dump storport driver 404 may then send (operation 1052) an INQUIRY for the boot LUN to the dump VMD 410, which may return the INQUIRY data to complete the initialization of the dump stack.

Following dump stack initialization, the kernel starts sending WRITE SRB requests that are served by dump VMD 410, dump SCBD 412, and dump SPFD 414 to ensure the crash-dump/hibernation completes successfully.

Any one or more processes or methods described above, including processes and methods associated with the flow diagrams in FIGS. 7A-7C, 8, 9A-9B, and 10A-10C, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A method, comprising:
associating each physical storage controller coupled to a bus with a protocol function driver;
performing a first initialization comprising initializing each physical storage controller with its protocol function driver;
virtualizing all physical storage controllers of a particular protocol with a storage controller bus driver and exposing a single virtual storage controller for each particular protocol;
associating a virtual miniport driver with each of the virtual storage controllers;
performing a second initialization comprising initializing each of the virtual storage controllers with its associated virtual miniport driver;
identifying redundant array of independent drives (RAID) virtual disks associated with the virtual storage controllers;
responsive to receiving a request for logical unit (LUN) information, exposing the RAID virtual disks;
associating a disk driver with each of the RAID virtual disks; and
exposing the RAID virtual disks to users.

2. The method of claim 1, further comprising:
sending, to a port driver, an input/output (I/O) request for a particular LUN associated with a virtual RAID controller;
routing, by the port driver, the I/O request to a particular virtual miniport driver associated with the virtual RAID controller;
generating, by the particular virtual miniport driver, a plurality of I/O request packets in accordance with a RAID level of the virtual RAID controller;
sending, by an I/O manager, the plurality of information request packets (IRPs) to the storage controller bus driver;
identifying, by the storage controller bus driver, storage protocol function driver objects corresponding to the plurality of IRP's; and
sending, by the I/O manager, the plurality of IRPs to the storage protocol function drivers.

3. The method of claim 1, further comprising:
responsive to receiving an indication of command completion from hardware associated with the storage protocol function driver, calling an interrupt service routine registered by the storage protocol function driver.

4. The method of claim 3, further comprising:
responsive to receiving an indication of command completion from the interrupt service routine registered by the storage protocol function driver, calling an interrupt service routine registered by the storage controller bus driver.

5. The method of claim 4, further comprising:
responsive to receiving an indication of command completion from the interrupt service routine registered by the storage controller bus driver, calling an interrupt service routine associated with the virtual miniport driver.

6. The method of claim 5, wherein the interrupt service routine associated with the virtual miniport driver is configured to:
process command completions for individual IRPs received; and
perform any error handling required.

7. The method of claim 1, further comprising:
loading a crash dump driver to obtain crash dump stack information;
querying a disk driver to obtain boot disk information indicative of a boot disk;
identifying a dump port driver associated with the boot disk;
sending an I/O control code to the dump port driver to obtain miniport dump driver information and other hibernation crash dump drivers;
loading a storage controller bus driver and obtaining crash hibernation context information;
storing information for the virtual storage controller associated with the boot LUN into the dump context;
loading storage protocol function driver information to obtain crash dump hibernation context information; and
storing peripheral component interconnect (PCI) configuration space of storage controllers associated with a boot LUN into a dump context.

8. The method of claim 7, further comprising:
responsive to detecting a crash dump or hibernation trigger, invoking the crash dump driver;
obtaining boot device information from the stored dump context;
loading, by the crash dump driver, a dump storage controller bus (SCB) driver and a dump storage protocol function (SPF) driver;
initializing, by the dump SPF driver, storage controllers associated with the boot LUN;
registering, by the dump SPF driver, callbacks for communicating with the dump SCB driver;
identifying, by the dump SCB driver, a virtual storage controller associated with the boot LUN;
creating a single virtual protocol controller for each particular protocol;
loading a dump port driver and a dump miniport driver;
registering, by the dump virtual miniport driver, callbacks for communication with the dump SCB driver;
requesting, by the dump port driver, initialization of the virtual storage controller;
initializing, by the dump virtual miniport driver, the virtual storage controller and a RAID core;
obtaining, from the dump SCB driver and the dump SPF driver, metadata indicative of virtual RAID disks associated with the virtual storage controllers;
obtaining, by the dump port driver, INQUIRY data for the boot LUN; and
processing a WRITE request for a dump file.

9. The method of claim 8, wherein processing the dump file includes:
- generating, by the dump port driver, WRITE SCSI request blocks (SRBs) for the RAID virtual disk;
- sending the WRITE SRBs to the dump virtual miniport driver;
- generating WRITE I/O requests in accordance with the RAID level for the boot LUN;
- sending the WRITE I/O requests to the dump SCB driver;
- identifying, by the dump SCB driver, virtual storage controllers associated with the WRITE I/O requests;
- forwarding, via the callbacks, the write I/O requests to the dump SPF driver; and
- sending, via callbacks, the WRITE I/O requests to disks associated with the dump SPF driver.

10. An information handling system, comprising:
- a processor; and
- a computer readable medium, including processor executable instructions for performing device stack operations comprising:
- establishing a driver stack including:
- a physical device object for each physical storage controller coupled to a PCI bus;
- a protocol functional driver object (FDO) corresponding to each physical device object;
- a storage controller bus driver FDO coupled to each of the protocol FDOs and configured to expose a single virtual controller physical device object (PDO) for each of a plurality of storage protocols;
- a virtual miniport driver FDO coupled to each virtual controller PDO
- a storport FDO coupled to each of the virtual miniport FDOs and further configured to expose a virtual disk PDO corresponding to each of the virtual miniport driver FDOs; and
- a disk driver FDO associated with each of the virtual disk PDOs.

11. The information handling system of claim 10, wherein the physical storage controllers include first storage controllers associated with a first storage protocol and second storage controllers associated with a second storage protocol.

12. The information handling system of claim 11, wherein the first storage controllers include non-volatile memory express (NVMe) storage controllers.

13. The information handling system of claim 12, wherein the virtual disk PDO corresponds to a redundant array of independent drives (RAID) virtual disk spanning a plurality of physical NVMe storage controllers.

14. The information handling system of claim 13, wherein the RAID virtual disk includes a boot logical unit (LUN).

15. The information handling system of claim 12, wherein the second storage controllers comprise serial AT attachment (SATA) storage controllers.

16. The information handling system of claim 10, wherein the operations include:
- establishing a crash dump/hibernation stack including a dump port driver, a dump virtual miniport driver, a dump storage controller bus driver, and a dump storage protocol function driver; and
- registering function call backs enabling the dump virtual miniport driver, the dump storage protocol function driver and the dump storage controller bus driver to communicate during crash or hibernation.

17. A computer readable storage medium including processor executable instructions that, when executed, cause the processor to perform operations including:
- discovering and initializing, by a storage protocol function driver, physical storage controllers coupled to a bus;
- exposing, by a storage controller bus driver, a protocol-specific virtual controller, corresponding to all physical storage controllers of a particular protocol, to a virtual miniport driver;
- initializing, by the virtual miniport driver, the protocol-specific virtual controller and discovering a redundant array of independent drives (RAID) virtual disk associated with the protocol-specific virtual controller, wherein the RAID virtual disk spans a plurality of the physical storage controllers of the particular protocol; and
- responsive to receiving a request for logical units (LUNs) from a storport driver, exposing, by the virtual miniport driver, the RAID virtual disk to the storport driver.

18. The computer readable medium of claim 17, wherein the RAID virtual disk corresponds to a boot device.

19. The computer readable medium of claim 18, wherein the RAID virtual disk spans a plurality of non-volatile memory express (NVMe) storage controllers.

20. The computer readable medium of claim 17, wherein the operations include:
- establishing a crash dump/hibernation stack including a dump port driver, a dump virtual miniport driver, a dump storage controller bus driver, and a dump storage protocol function driver; and
- registering function call backs enabling the dump virtual miniport driver, the dump storage protocol function drier and the dump storage controller bus driver to communicate during crash or hibernation.

* * * * *